US006954659B2

(12) United States Patent
Tushinsky et al.

(10) Patent No.: US 6,954,659 B2
(45) Date of Patent: Oct. 11, 2005

(54) FASHION ACCESSORY WITH WIRELESS SIGNAL ALERTING DEVICE

(75) Inventors: Robert J. Tushinsky, Austin, TX (US); Morton Gorowitz, Boynton Beach, FL (US)

(73) Assignee: World Mobile Technologies, Inc., Austin, TX (US)

( * ) Notice: Subject to any disclaimer, the term of this patent is extended or adjusted under 35 U.S.C. 154(b) by 0 days.

(21) Appl. No.: 10/997,421

(22) Filed: Nov. 23, 2004

(65) Prior Publication Data

US 2005/0113081 A1 May 26, 2005

Related U.S. Application Data

(60) Provisional application No. 60/524,595, filed on Nov. 24, 2003.

(51) Int. Cl.[7] .................................................. H04M 1/00
(52) U.S. Cl. ..................... 455/567; 455/41.2; 455/557; 455/88; 455/66.1; 340/539.15; 340/539.11; 340/225.69; 379/433.1
(58) Field of Search ................................. 455/567, 41.2, 455/577, 88, 66.1, 550.1; 340/539.15, 539.11, 825.69; 379/433.1

(56) References Cited

U.S. PATENT DOCUMENTS

| | | |
|---|---|---|
| 3,755,663 A | 8/1973 | George, Jr. |
| 3,805,047 A | 4/1974 | Dockstader |
| 4,076,976 A | 2/1978 | Fenton |
| 4,096,552 A | 6/1978 | Ben-Porat |
| 4,101,955 A | 7/1978 | DuNah |
| 4,297,677 A | 10/1981 | Lewis et al. |
| 4,421,953 A | 12/1983 | Zielinski |
| 4,769,656 A | 9/1988 | Dickey |
| 4,779,172 A | 10/1988 | Jimenez et al. |
| 4,791,536 A | 12/1988 | James |
| 4,803,487 A | 2/1989 | Willard et al. |
| 4,930,052 A | 5/1990 | Beige |
| 5,007,105 A | 4/1991 | Kudoh et al. |
| 5,201,578 A | 4/1993 | Westmoreland |
| 5,477,433 A | 12/1995 | Ohlund |
| 5,722,071 A | 2/1998 | Berg et al. |
| 5,752,203 A | 5/1998 | Yamashita |
| 5,848,362 A | 12/1998 | Yamashita |
| 5,886,669 A | 3/1999 | Kita |
| 5,896,096 A | 4/1999 | Kim |
| 5,960,367 A | 9/1999 | Kita |
| 6,164,815 A | 12/2000 | Degonda |
| 6,175,729 B1 | 1/2001 | He et al. |
| 6,181,237 B1 | 1/2001 | Gehlot |
| 6,184,796 B1 | 2/2001 | Rivero et al. |
| 6,218,958 B1 * | 4/2001 | Eichstaedt et al. ........... 340/7.6 |
| 6,238,119 B1 | 5/2001 | Liu |
| 6,249,222 B1 * | 6/2001 | Gehlot ........................ 340/540 |
| 6,263,218 B1 * | 7/2001 | Kita ............................ 455/567 |
| 6,272,359 B1 * | 8/2001 | Kivela et al. |
| 6,296,364 B1 * | 10/2001 | Day et al. |

(Continued)

*Primary Examiner*—William Trost
*Assistant Examiner*—Danh C Le
(74) *Attorney, Agent, or Firm*—O'Melveny & Myers LLP

(57) ABSTRACT

A fashion accessory provides a visual alert for the presence of a mobile communication signal from a nearby but not physically connected communication device. The accessory includes a signaling assembly for providing a visual signal when a mobile communication signal is detected within a defined distance, an antenna connected to the signaling assembly and extending from it, and an elongated member configured for attaching the fashion accessory to a body part or personal article. The signaling assembly may include a circuit module with an LED providing a visible signal when an adjacent mobile communication device is transmitting a signal within the defined distance. The defined distance is selected so as to make the fashion accessory responsive only to signals from a mobile device within a user's personal space.

29 Claims, 4 Drawing Sheets

U.S. PATENT DOCUMENTS

| | | | |
|---|---|---|---|
| D454,551 S | 3/2002 | Bonadei et al. | |
| 6,373,439 B1 * | 4/2002 | Zurcher et al. | |
| 6,424,251 B1 * | 7/2002 | Byrne | |
| 6,578,981 B2 * | 6/2003 | Jackson et al. | |
| 6,594,370 B1 * | 7/2003 | Anderson | |
| 6,650,231 B1 * | 11/2003 | Byrne | |
| 6,882,870 B2 * | 4/2005 | Kivelä et al. | 455/567 |
| 2002/0032020 A1 * | 3/2002 | Brown et al. | 455/414 |
| 2002/0086714 A1 * | 7/2002 | Wang et al. | |
| 2002/0115478 A1 * | 8/2002 | Fujisawa et al. | |
| 2002/0186122 A1 * | 12/2002 | Gehlot | |
| 2004/0031287 A1 * | 2/2004 | Leason et al. | |
| 2004/0057578 A1 * | 3/2004 | Brewer | 379/433.1 |
| 2004/0185915 A1 * | 9/2004 | Ihara et al. | 455/469.1 |
| 2004/0204153 A1 * | 10/2004 | Benco et al. | 455/567 |

* cited by examiner

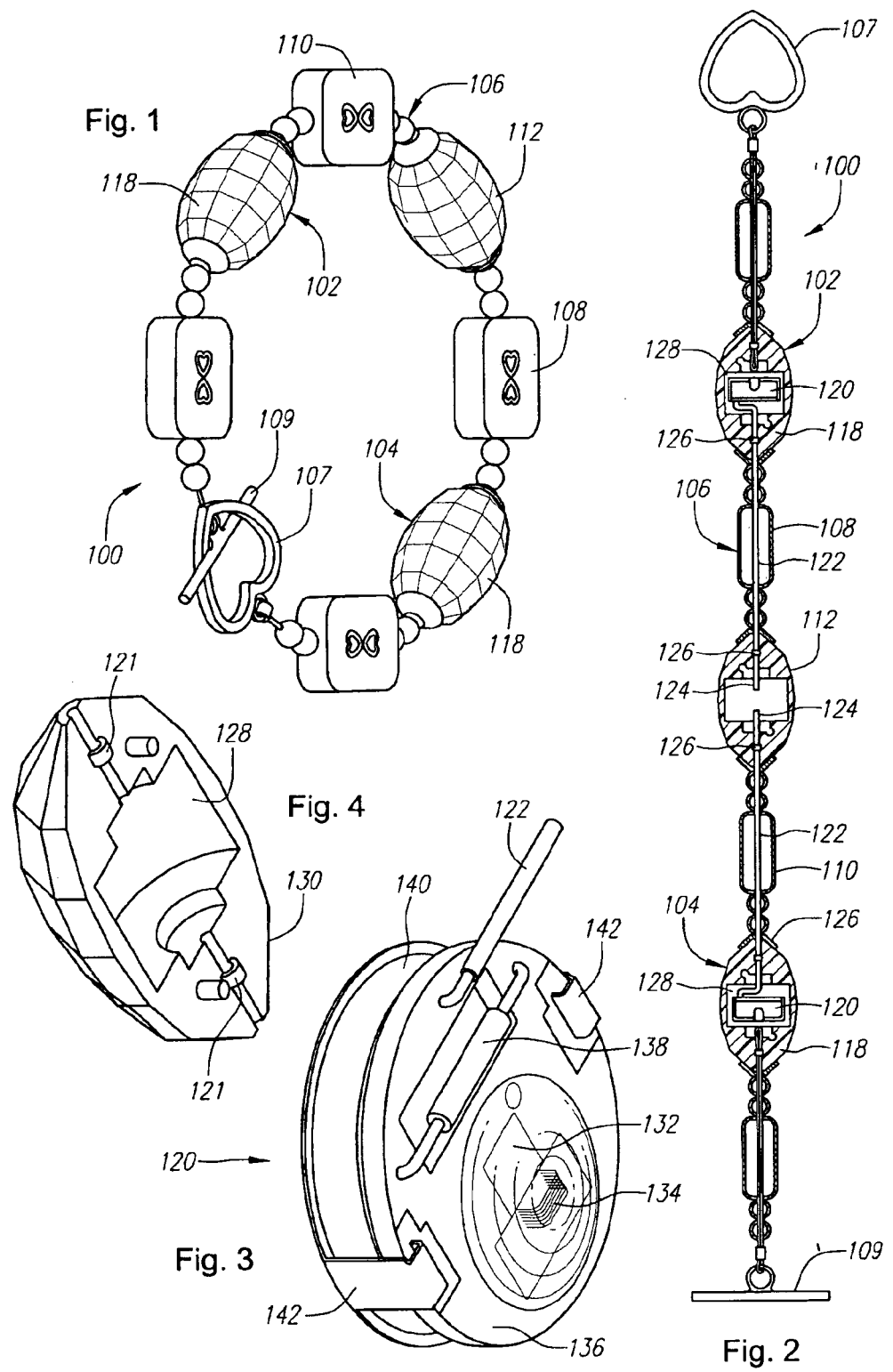

FASHION ACCESSORY WITH WIRELESS SIGNAL ALERTING DEVICE

CROSS-REFERENCE TO RELATED APPLICATION

This application claims priority pursuant to 35 U.S.C. § 119(e) to U.S. Provisional Application No. 60/524,595, filed Nov. 24, 2003, which application is specifically incorporated herein, in its entirety, by reference.

BACKGROUND OF THE INVENTION

1. Field of the Invention

The present invention relates to jewelry that incorporates electronic circuitry, and more particularly, to jewelry with circuitry for alerting the wearer to the presence of a wireless communication signal such as generated by a mobile telephone.

2. Description of Related Art

Mobile telephones and similar wireless communication devices are in widespread use today. Such telephones typically employ an audible signal, such as a ring tone, to alert the user of incoming calls. Other signals, such as vibratory alerts, may also be employed for this purpose. A signal such as a flashing light may also be used, but is not useful when the mobile telephone is carried so as to render a light invisible to the user, such as in a pocket, purse or other receptacle, or otherwise out of a user's line of sight.

In addition, the use of audible or vibratory signals is discouraged or prohibited in many circumstances. For example, in classrooms, meetings, movies and other quiet environments, users of mobile phones may desire or be required to turn off audible or vibratory alerts. In other environments, for example in a dance club, at a concert, or factory floor, the mobile phone user may be too distracted by noise or other activity to notice an audible or vibratory signal. Either way—if the phone signal is turned off or simply not noticed by the user—incoming calls may be missed or unintentionally ignored.

Compact circuitry for illuminating a light, such as an LED, in the presence of an wireless communication device is known in the art. Such circuitry has been incorporated, for example, in the body of a pen. Lacking the more complex processor of the mobile communication device, prior-art compact wireless alert circuitry will react to the presence of any wireless signal within its range of sensitivity. Therefore, a device equipped with the circuitry will alert the user not only when the user receives a call, but also anytime a mobile telephone within its range of sensitivity is in use. Generally, such non-specific sensitivity is undesirable. On the other hand, if the circuitry is not sufficiently sensitive, it will fail to sense an incoming call even if the user's mobile phone is only a short distance away, such as in a nearby purse. In other words, it is desirable to provide a signaling device that will be activated by the user's own cellular phone but not others.

In this regard, a "personal space" may be defined as a space in which the user's own mobile communication device will usually be the only device present. For example, a personal space for a person's body may be defined as the space within about three feet of the person's body, whereas a personal space for a user's room or home may be larger. Within the applicable personal space, it should be possible to use less expensive non-specific alerting circuitry (i.e., circuitry responsive to signals from different mobile communication devices), without responding to most or all signals from mobile communication devices other than the user's. For example, with a fashion accessory designed to be placed on or near the user's body, sensitivity to about three feet away, but not substantially beyond three feet, should usually be compatible with the user's personal space. It is desirable, therefore, to control the sensitivity of non-specific alert circuitry to respond to mobile communication devices placed within a defined distance of the alert circuitry.

An alert circuit's sensitivity to wireless signals is at least partially determined by the dimensions and configuration of its connected antenna for the wireless signal. For example, if the antenna is too short, it will not be sufficiently sensitive, and will not reliably pick up signals from the user's telephone. If it is too long, it will be too sensitive, picking up signals from too large an area. It may be difficult to accommodate an antenna of suitable length and configuration many small articles. For example, fashion accessories such as costume jewelry may often impose design constraints that may make it difficult to accommodate a suitably-sized antenna.

It is desirable, therefore, to provide a compact and inexpensive fashion accessory, such as a bracelet or necklace, for alerting the wearer to the presence of an incoming call using a visual signal, such as a blinking or steady light. The accessory should be configured to alert the user to a wireless communication signal from a mobile telephone, pager or similar device within the user's personal space. For example, the accessory may be responsive within about a three-foot distance from a user's cell phone, but not to signals from cell phones more than about three feet away. The accessory should be small enough to wear as a bracelet, watch, or similar accessory, and should be aesthetically pleasing as a piece of costume or fine jewelry. In addition, the accessory should be rugged and affordable.

SUMMARY OF THE INVENTION

The present invention provides a fashion accessory that overcomes the limitations of the prior art, and method for making it. The fashion accessory may be configured as a single encasement, or a plurality of encasements that are strung together in a bracelet, pendant, necklace, brooch, or the like. One or more of the encasements comprises an inner cavity that holds a compact sensor chip, miniature battery, and LED integrated into an alerting circuit module. An encasement may comprise, for example, a ornamental bead, block or crystal, a housing for a timepiece, rubber or plastic tubing, a decorative band, or the like. The bead or other encasement is comprised at least partially of a transparent or translucent material, such as plastic or glass, so as to transmit light from the LED. The LED is configured to illuminate when the sensor detects a wireless communication signal within the range of frequencies and signal strength that it is sensitive to. Hence, the case enclosing the alerting circuit module is conveniently referred to herein as an "illuminated case." The illuminated case may be of any shape that is aesthetically pleasing and wearable as a fashion accessory. The sensor chip is connected to an antenna that is strung through one or more passive (non-illuminated) beads or other decorative housing. Optionally, the antenna may be used both as a mechanical structure for stringing beads or other cases and as an antenna for the alerting circuit module. A suitable antenna for personal jewelry may be, for example, between about one inch and four inches in length.

Each illuminated case, alerting circuit module and its associated antenna, optionally strung through a plurality of passive beads or other structural or decorative housings, comprises an alerting accessory module. A single accessory module may be attached to any suitable structure for holding jewelry, for example, a pin, clasp, or the like, to provide a fashion accessory for alerting its wearer to the presence of a wireless communication signal in the vicinity of the wearer. Two or more alerting accessory modules may be strung together to form a bracelet, anklet, pendant, necklace, or the like. Because wireless communication signals are directional in nature, the combination of two or more alerting accessory modules in a single fashion accessory may increase the functionality of the accessory, by increasing the probability that at least one of the modules will be favorably oriented for sensing a nearby signaling telephone.

Advantageously, a fashion accessory according to the invention may be made of suitably inexpensive materials, for example, plastics or non-precious metals, so that the accessory may be regarded as disposable, and simply discarded when the battery life is spent. In the alternative, the illuminated case may be designed to be opened after assembly, so that the alert circuit module can be accessed for battery replacement.

Thus, a person wearing a fashion accessory will receive a visual signal by illumination of the LED when her mobile telephone receives an incoming phone signal. This may be used to alert the user to an incoming call when the mobile phone alert is off or is not loud enough to be heard in a noisy environment, or if in a vibrating alert mode, is not in contact with the user. In addition, some users may find that the illuminating accessories are attractive and fun to wear, regardless of their other functions.

A more complete understanding of the fashion accessory with wireless signal alerting device will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a perspective view of an exemplary fashion accessory according to the invention.

FIG. 2 is a cross-sectional view of the accessory shown in FIG. 1.

FIG. 3 is an enlarged perspective view of an exemplary alert circuit module for mounting inside of an illuminated case, excluding its attached antenna.

FIG. 4 is an enlarged perspective view of one-half of an exemplary illuminated case from the accessory shown in FIG. 1.

DETAILED DESCRIPTION OF THE PREFERRED EMBODIMENT

Figure 5:
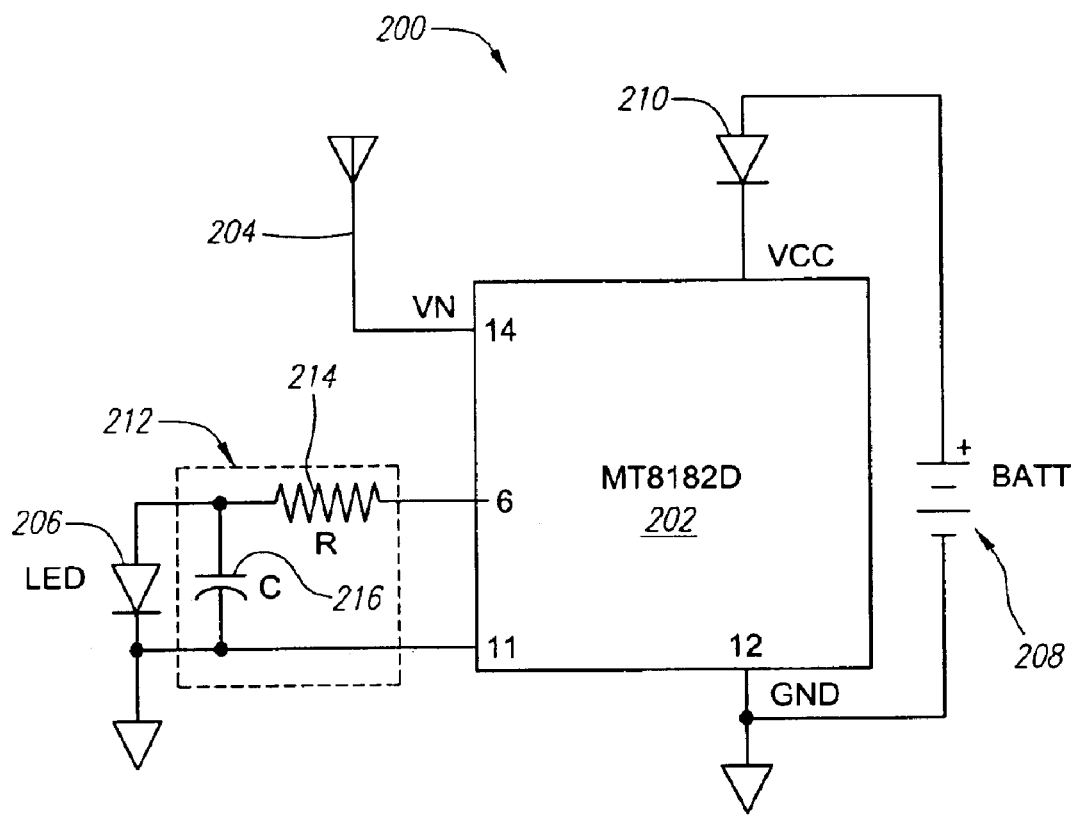
FIG. 5 is a circuit diagram showing an exemplary alert circuit according to the invention.

The present invention provides a fashion accessory with a wireless alerting device, that overcomes the limitations of the prior art. In the detailed description that follows, like numerals are used to indicate like elements appearing in one or more of the figures.

Referring to FIGS. 1 and 2, in an embodiment of the invention, a fashion accessory 100 is configured as a bracelet. Accessory 100 includes a first signaling assembly 102 connected to a second signaling assembly 104 via an elongated member 106, for example, a strap, cord, tube or chain. In the illustrated embodiment, the elongated member comprises and is henceforth referred to as an ornamented chain 106. Chain 106 is divided into first and second portions 108, 110 by a central case 112. Clasps portions 107, 109 may be provided at opposite ends of the ornamented chain for forming a loop of the accessory 100. The ornamental clasp depicted is merely exemplary, and any suitable clasp may be used. First and second assemblies 102, 104 may be substantially identical, each comprising an ornamented bead 118 holding a circuit module 120. The circuit module is configured to activate a light-emitting diode (LED) when the presence of a mobile communication signal from a nearby device is sensed. Circuit modules for this purpose are known in the art. The LED may selected so as to illuminate in any visible color (e.g., red, orange, yellow, green, blue, indigo, violet and white) for which an LED is available.

Each of the first and second signaling assemblies 102, 104 further includes an antenna 122 connected to circuit module 120. A ring 121 or other retainer attached to case 130 may be used to hold the antenna 122 and circuit module 120 in place, when the case is opened replace the battery. Preferably, antenna 122 is selected to have an end-to-end length and geometric configuration that is appropriate for imparting the desired signal sensitivity to the fashion accessory. Different antenna lengths and configurations may be appropriate, depending on various factors, including, for example, the characteristics of the mobile communication signal to be sensed, the desired range of sensitivity, and the design of the circuit module.

For personal use applications, it is generally desirable that the signaling assemblies be sensitive to signals emanating from a mobile communication device within about a three-foot distance from the user. This distance should permit the fashion accessory to respond to signals from the wearer's mobile communication device, without responding to signals from other devices that are not very near to the wearer of the fashion accessory; i.e., within the user's personal space. Of course, greater or lesser sensitivity to mobile communication signals may also be selected.

For example, an extended, substantially linear antenna length between about one to four inches is believed suitable for jewelry designed for use with typical mobile communication devices within the United States. Suitable materials for antenna 122 may include one or more conductive wires, for example, single-strand or multi-stranded wires of copper or aluminum alloys as known in the art. In an embodiment of the invention, the antenna is comprised of at least five copper wires entwined together for strength, then coated with a flexible plastic material for added strength and protection.

The antenna 122 should be configured to extend from the circuit module 120 in a substantially linear configuration. To accommodate the excess antenna length, a distal portion of the antenna may be threaded inside or alongside the ornamented chain 106. A distal end 124 of antenna 122 may be anchored inside an adjacent bead 112. In the depicted embodiment, the central bead 122 does not contain a circuit module, although it is of the same design as beads 118. In the alternative, the anchoring central bead 112 may contain a circuit module with an LED signal, or may incorporate an alternative design.

Anchoring collars or beads 126, or any other suitable fastener, may be used to attach the distal ends 124 of antenna 122 to adjacent beads of accessory 100. For example, anchor 126 may be crimped to the antenna wire and engaged with a holdfast in the central bead 112. If the antenna is made of a sufficiently strong material, antenna 122 may also serve as a structural connector for stringing beads of the accessory 100. Stress may thereby be relieved from chain 106, which consequently may be made lighter or of weaker materials than might otherwise be possible. Chain 106 may comprise a hollow interior extending from end-to-end, through which the antenna may be threaded, as shown in FIG. 2. In the alternative, the antenna may be strung at least partially along an exterior of the connecting chain (not shown).

For a simpler look, the connecting chain may be omitted entirely, and the connecting load may be borne entirely by the antenna. In such case, the antenna may be used to string unlighted ornamental beads between the lighted ornamental cases 118. In addition, or in the alternative, the antenna may be strung inside a plastic or rubber tube, or through a flat decorative band. The tube or band may have an ornamental design, and/or may be inserted through ornamental charms or beads. For a timepiece, the antenna may extend from a central case in or adjacent to a wrist band or carrying strap.

In addition to antenna length, sensitivity may also be affected by antenna orientation. Fashion accessories may shift frequently with movements of the users, and the orientation of the antenna is unpredictable. To improve the probability that at least one signaling assembly will be connected to a properly oriented antenna, two or more independent signaling assemblies may be combined in a single fashion accessory. For example, FIGS. 1 and 2 show a bracelet with two signaling assemblies 102, 104 each having its own antenna. When configured as a bracelet with clasp portion 107, 109 engaged as shown in FIG. 1, the antennas connected to the respective signaling assemblies 102, 104 will naturally tend to be in different orientations.

FIG. 3 shows an enlarged view of an exemplary circuit module 120. The module comprises a semiconductor chip 132 containing the logic for switching power to an LED 134 when antenna 122 receives a sufficiently strong communication signal. Various suitable chips are commercially available, and one of ordinary skill may devise a suitable chip. The chip 132, LED 134, and any other necessary components such as resistor 138 may be mounted on a board 136. To facilitate installation inside of a round bead, board 136 may be circular in shape. A battery 140, which is also circular and has approximately the same diameter as board 136, may be clipped to the board using clips 142. The entire module 120 is compact and small enough to fit inside the structural or decorative case of a fashion accessory, such as inside an ornamental bead of the depicted embodiment. For example, the module including the battery may be about 0.25 inches thick and about 0.38 inches in diameter. Smaller or larger sizes may also be used.

Beads 118 may be molded in two halves, and provided with an interior compartment 128 for holding a circuit module 120. FIG. 4 shows a half 130 of an exemplary bead 118. To form a bead 118, half 130 may be mated with a complementary half (not shown). The bead halves may be configured to permit disassembly and reassembly without damaging the bead halves. This may permit servicing of the circuit module enclosed in the bead, such as battery replacement, if desired. Various plastic materials as known in the art for fashion accessories may be suitable for beads 118. At least a portion of the beads or other encasement 118 should be translucent or transparent to transmit light from the circuit module 120 to an exterior of the bead. In the depicted embodiment, beads 118 are fashioned entirely of translucent materials.

FIG. 5 is a diagram of an exemplary alert circuit 200 according to the invention. Integrated circuit 202 comprises a suitable chip as known in the art, having at least one input for attaching an antenna, and providing at least one output for activating an LED when an RF signal is picked up by an antenna connected to the antenna input. In circuit 200, any suitable antenna 204 as described herein may be attached to an input terminal of chip 202. An LED 206 is attached across output terminals of chip 202 and to ground. A suitable power source, such as a battery 208, is attached to power terminals of the chip. For example, battery 208 may comprise a 3 Volt lithium ion battery. Optionally, a diode 210 may be placed in the circuit between the power source and the chip, to prevent unintentional supply of power having the wrong polarity.

Circuit 200 may be vulnerable to generating false alerts from static interference picked up by antenna 204. For example, motion of a wearer's body may cause RF pulses to be detected and signaled by LED 206. To prevent such false alerts, a filter 212 may be placed across the terminals of LED 206. Filter 212 may be configured to absorb very brief pulses of energy to the LED, thereby preventing it from illuminating in response to interference picked up by antenna 204. When a more sustained RF signal such as from a mobile communication device is picked up by the antenna, filter 212 passes the resulting more sustained energy pulse from chip 202, causing the LED to illuminate.

To configure filter 212, resistor 214 should be selected based on the current and voltage required to illuminate the LED in comparison to the current and voltage supplied by chip 202. It may be advantageous to select a resistor having as much resistance as possible, without noticeably impeding illumination of the LED. For example, a resistor value in the range of about 100 Ω may be suitable for many applications. Then, a capacitor 216 should be selected based on the value of the resistor and the desired filtering frequency. It may be advantageous to select a value for capacitor 216 that is as small as possible, while still effectively filtering out pulses having a frequency less than the desired filtering threshold. One of ordinary skill may select suitable values for resistor 214 and capacitor 216, based on the factors described above.

Advantageously, a user need not make any modifications to her cellular telephone or other communication device to make use of an alerting accessory according to the invention. Circuit 200 may be configured to receive signals within 800–1900 MHz on global system for mobile communications (GSM) and time division multiple access (TDMA) methods of digital wireless communications transmission. When an incoming call is received using these methods, the receiving device generates a return acknowledgement or "handshake" as known in the art. The strength of the outgoing handshake signal is strongest immediately adjacent to the antenna of the cellular telephone, and diminishes with distance.

Circuit 200 may be configured to respond to the handshake generated by the user's mobile phone. Hence, the user may be alerted as to the presence of an incoming communication signal without being required to carry the communication device. The cellular telephone can be in a purse or backpack or anywhere else within the user's personal space, and the circuit will indicate the presence of an incoming call by illuminating the LED, such as by flashing.

Figure 6:
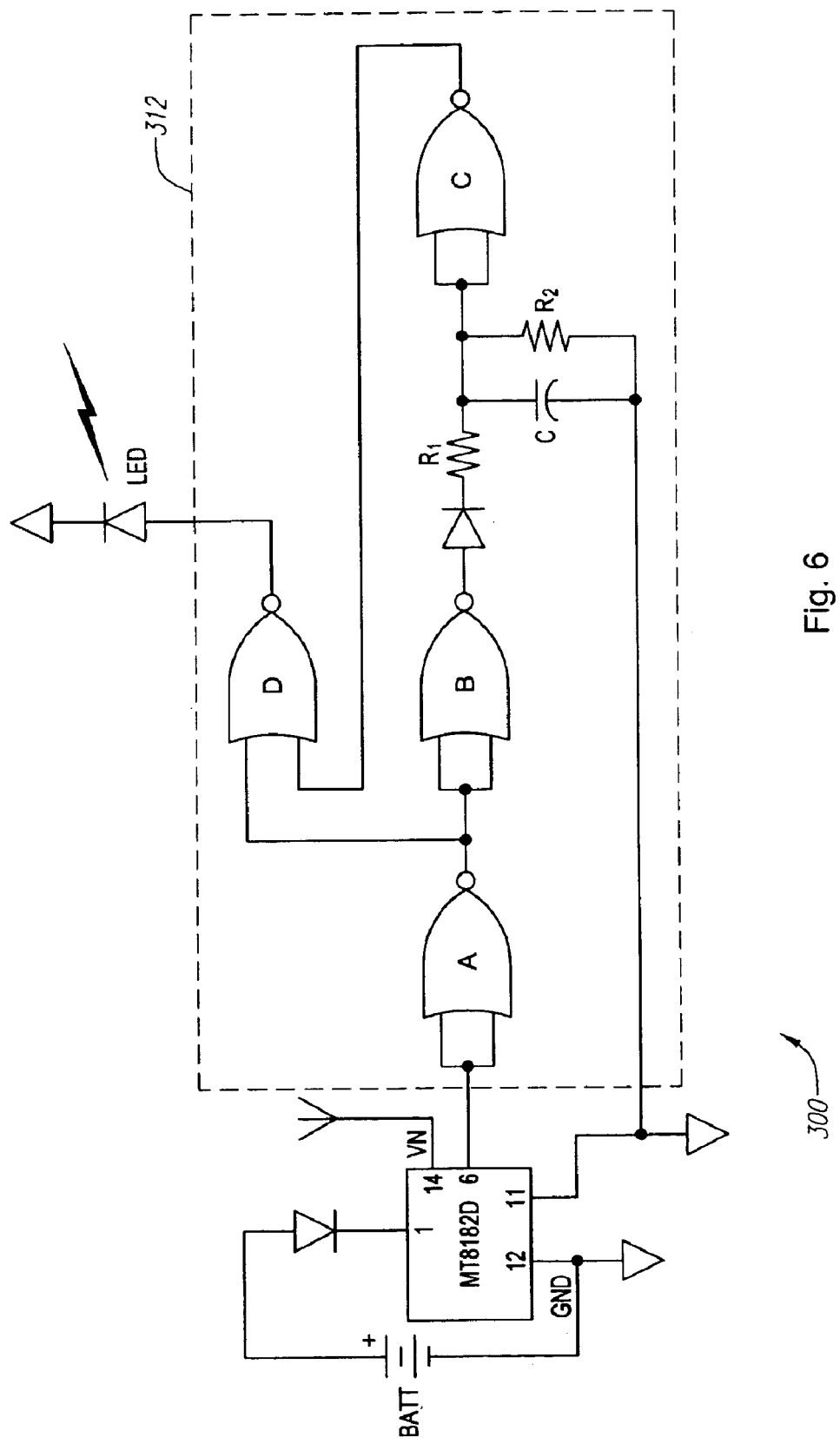
FIG. 6 is a circuit diagram showing an exemplary alert circuit according to an alternative embodiment of the invention.

FIG. 6 shows an alert circuit 300 according to an alternative embodiment of the invention. Circuit 300 comprises a filter 312 similar to filter 212, but further incorporating a plurality of NOR gates A–D, such as may be provided on a CMOS chip. Gates A–C are wired as inverters, and gate D as a NOR gate. Resistor R1 and capacitor C may be adjusted as previously described to prevent the LED from illuminating in response to transient noise. Resistor R2 is provided to allow capacitor C to discharge when no signal is present, and should be selected to have a resistivity much higher than R1.

Figure 7A:
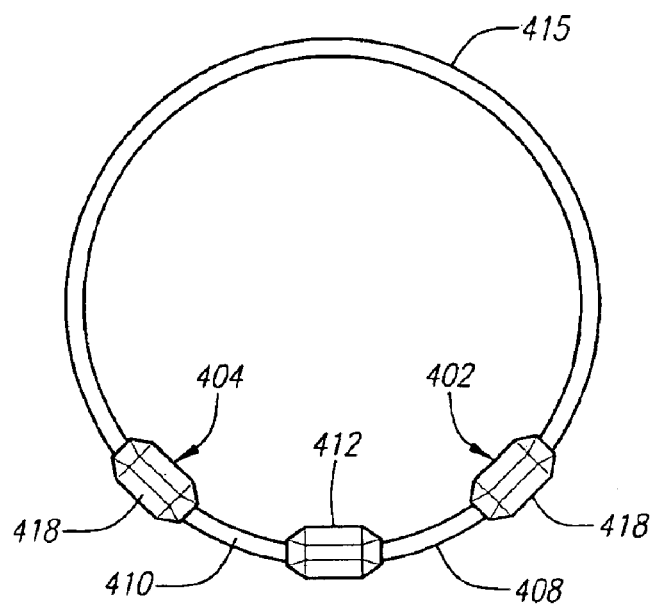
FIG. 7A is a perspective view showing an exemplary fashion accessory according to an alternative embodiment of the invention.
Figure 7B:
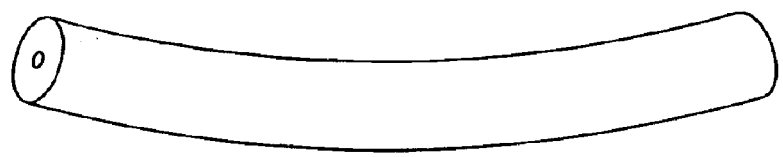
FIGS. 7B and 7C are detail and cross-sectional detail views showing a portion of the fashion accessory of FIG. 7A, respectively.
Figure 7C:
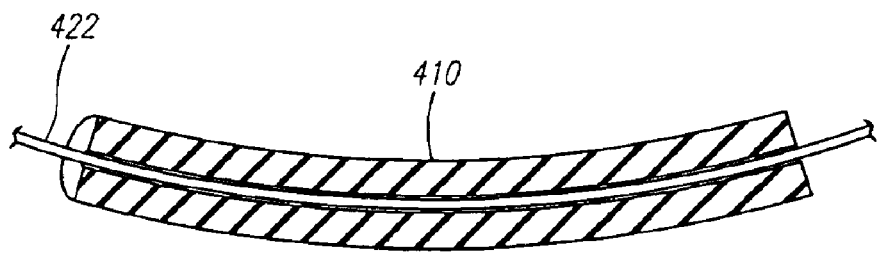

FIGS. 7A–C show a fashion accessory 400 according to an alternative embodiment, and certain details thereof. Accessory 400 comprises signaling assemblies 402, 404, which may be configured similarly to assemblies 102, 104 previously described in connection with FIGS. 1–2. For example, alert circuit modules as previously described may be housed in separate encasements 418 that are connected by respective elongated members 410, 408. An antenna may be threaded through an interior of the elongated members 410 and 408, and anchored in a central encasement 412 in a manner similar to accessory 100. In the alternative, or in addition, an antenna of suitable length may be strung through the elongated member 415 connecting assemblies 402, 404.

Accessory 400 illustrates the use of an extended antenna 422 in connection with one or more elongated members 410, 412, 415 of essentially tubular form as connecting members between signaling assemblies, or for attaching to a personal article or clothing of a user. For example, these members may comprise a structural or decorative tubing material of any desired cross-section, including but not limited to the smooth cylindrical tubing as shown. Other suitable tubing may include, for example, flattened tubing, hexagonal tubing, ribbed tubing, and so forth. Antenna 422 may be configured to run through an interior portion of such tubing. In the alternative, the antenna may be molded or formed in place with the tubing material. In either alternative, most or all of any exposed portion of the antenna may be encased by the tubular member. If selected of sufficiently strong material, antenna 422 may provide a structural connection between adjoining signaling assemblies 402, 404. In other respects, accessory 400 may be configured similarly to accessory 100, and may be modified or adapted in similar ways.

Having thus described a preferred embodiment of fashion accessory with a wireless signal alerting device, it should be apparent to those skilled in the art that certain advantages of the within system have been achieved. It should also be appreciated that various modifications, adaptations, and alternative embodiments thereof may be made within the scope and spirit of the present invention. For example, a bracelet using beads as illuminated cases has been illustrated, but it should be apparent that the inventive concepts described above would be equally applicable to other types of fashion accessories, for example, necklaces, brooches, rings, timepieces, and so forth. The invention is further defined by the following claims.

What is claimed is:

1. A fashion accessory operative to provide a visual alert for the presence of a mobile communication signal from a mobile communication device located within a personal space of a user, the accessory comprising:

a signaling assembly for providing a visual signal when a mobile communication signal is detected within a defined distance from the signaling assembly;

an elongated member attached to the signaling assembly, the elongated member configured for attaching the fashion accessory to a visible location selected from a portion of a user's body or a personal article of the user; and an antenna connected to the signaling assembly and extending for a distance from the signaling assembly in a substantially linear configuration along the elongated member, wherein the fashion accessory is not connected to the mobile communication device.

2. The fashion accessory of claim 1, wherein the defined distance is in the range of about one to four feet.

3. The fashion accessory of claim 1, wherein the defined distance is in the range of about four to twelve feet.

4. The fashion accessory of claim 1, wherein the fashion accessory is configured as a bracelet.

5. The fashion accessory of claim 1, wherein the fashion accessory is configured as a necklace.

6. The fashion accessory of claim 1, further comprising a second signaling assembly connected to the first signaling assembly.

7. The fashion accessory of claim 1, wherein the elongated member comprises a chain of linked members, and the antenna is threaded through links of the chain.

8. The fashion accessory of claim 1, wherein the signaling assembly comprises a circuit module, that when placed on or adjacent to a user, is operative provide the visual signal when generally any operative GSM or TDMA mobile communication device located within a personal space of the user receives an incoming signal, and to not respond when like mobile communication devices located outside the personal space of the user receive an incoming signal.

9. The fashion accessory of claim 8, wherein the circuit module further comprises a sensor chip operative to sense activation of the antenna by a mobile communication signal, a light-emitting diode connected to the sensor chip, and a battery connected to the sensor chip.

10. The fashion accessory of claim 8, wherein the circuit module further comprises an RF filter disposed across terminals of the light-emitting diode.

11. The fashion accessory of claim 8, wherein the circuit module further comprises an RF filter configured to prevent activation of the light-emitting diode in response to activation of the antenna by transient pulses of static interference.

12. The fashion accessory of claim 11, wherein the RF filter comprises a capacitor and a resistor connected in parallel.

13. The fashion accessory of claim 12, wherein the RF filter further comprises a plurality of NOR gates.

14. The fashion accessory of claim 8, wherein the antenna extends from the circuit module for a length of at least about one inch and not greater than about four inches.

15. The fashion accessory of claim 8, wherein the antenna extends from the circuit module for a length of at least about four inches and not greater than about twenty inches.

16. The fashion accessory of claim 8, wherein the signaling assembly further comprises an ornamented case enclosing the circuit module, the case comprising a translucent portion configured for transmitting the visible signal to an exterior of the case.

17. The fashion accessory of claim 16, wherein the antenna extends from the case into an interior space of the elongated member.

18. The fashion accessory of claim 16, wherein the antenna extends through an interior of the elongated member into an adjacent case.

19. The fashion accessory of claim 16, wherein a distal end of the antenna is anchored in an adjacent case.

20. The fashion accessory of claim 16, wherein the ornamental case comprises a molded piece comprised of mating halves.

21. The fashion accessory of claim 16, wherein the ornamental case comprises an interior space configured to hold the circuit module.

22. The fashion accessory of claim 16, wherein the antenna extends from the case adjacent to the elongated member, and has a distal end anchored in an adjacent case.

23. The fashion accessory of claim 16, further comprising a second signaling assembly substantially identical to the first signaling assembly and attached thereto.

24. The fashion accessory of claim 23, wherein the first and second signaling assemblies are connected by the elongated member, the elongated member having an interior space open from a first end to a second end thereof.

25. The fashion accessory of claim 24, wherein the antenna of the first signaling assembly extends from the case of the first signaling assembly into the interior space of the elongated member, and an antenna of the second signaling assembly extends from a case of the second signaling assembly into the interior space of the elongated member.

26. The fashion accessory of claim 23, wherein the antenna of the first signaling assembly and the antenna of the second signaling assembly are anchored in a central member interposed between the first signaling assembly and the second signaling assembly.

27. The fashion accessory of claim 26, wherein the central member comprises an ornamental case like the ornamental case of the first signaling assembly.

28. The fashion accessory of claim 27, wherein the central member comprises an ornamented translucent bead having a hollow interior.

29. The fashion accessory of claim 1, wherein the elongated member comprises a tubular member encasing the antenna for at least a portion of the distance extending from the signaling assembly.

* * * * *